(No Model.)
T. T. PROSSER.
File-Cutting Machine.
No. 231,094.  Patented Aug. 10, 1880.
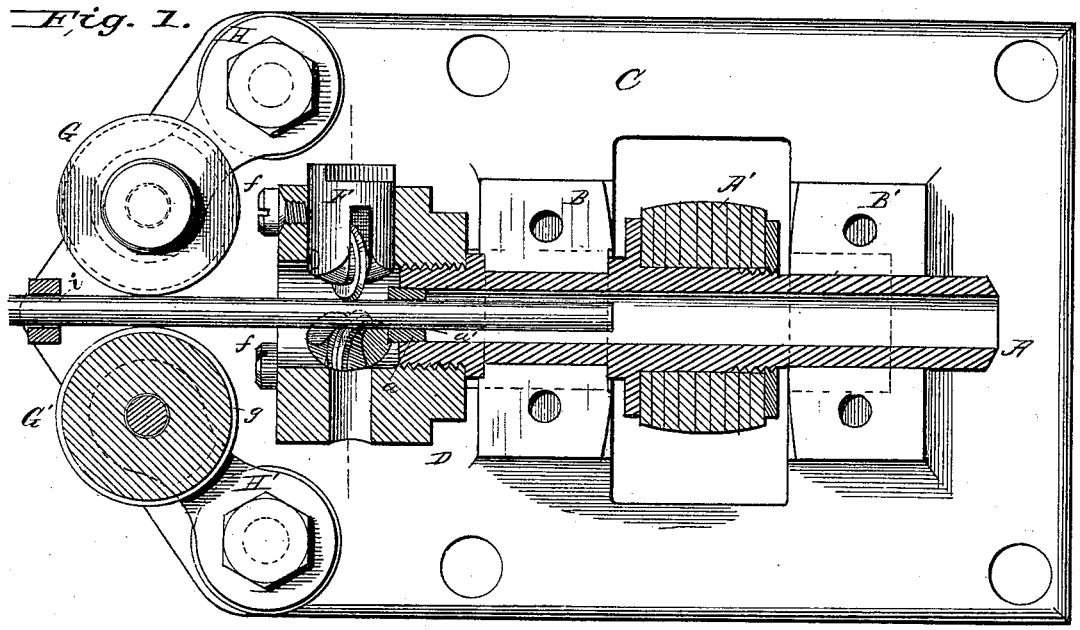
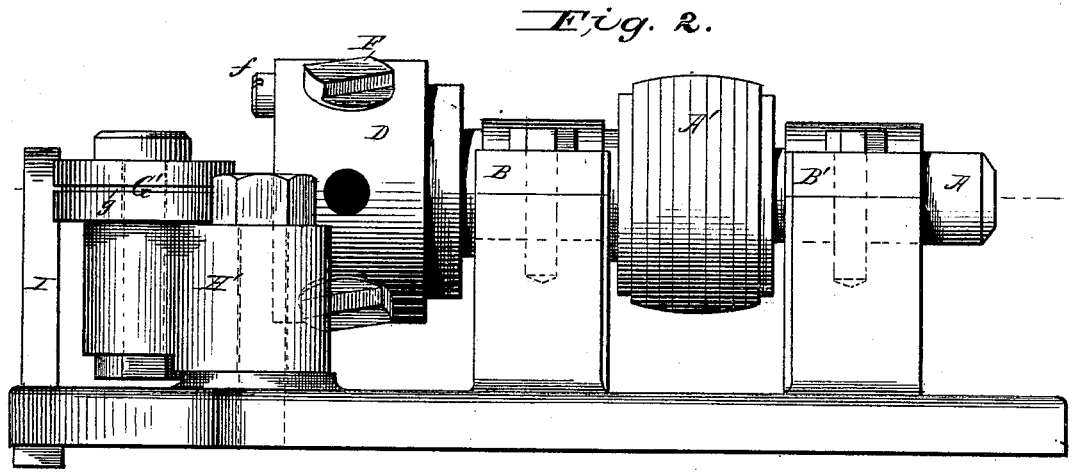
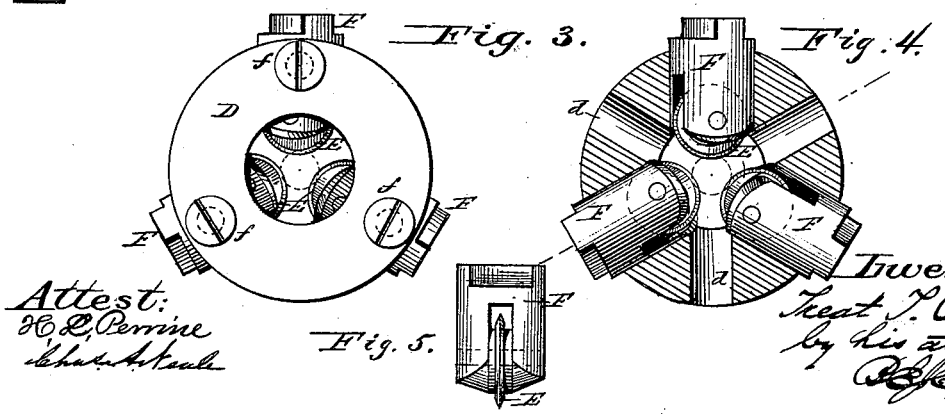

UNITED STATES PATENT OFFICE.

TREAT T. PROSSER, OF CHICAGO, ILLINOIS.

FILE-CUTTING MACHINE.

SPECIFICATION forming part of Letters Patent No. 231,094, dated August 10, 1880.

Application filed April 8, 1880. (No model.)

*To all whom it may concern:*

Be it known that I, TREAT T. PROSSER, a citizen of the United States, residing at Chicago, in the county of Cook and State of Illinois, have invented certain new and useful Improvements in File-Cutting Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a machine for cutting round files, so organized as to form the teeth thereon by raising a spiral burr on the surface of the file from one end to the other by means of rotary disks set in planes oblique to the axis of the file.

My improvement consists of certain combinations set forth in the claims at the close of this specification and made up out of mechanical devices of which the following are the principal: a revolving hollow mandrel; a hollow chuck secured to the overhung end of the hollow mandrel; a series of rotary disks (three, by preference) mounted in adjustable hangers or bearings carried by the hollow chuck; a pair of peripherally-grooved rolls arranged in front of the hollow chuck. Various minor devices are also used to make up some of the combinations claimed.

In order that my invention may be clearly understood, I will proceed to describe the form thereof in which I have embodied it in a working machine, with the understanding that the details of construction may be changed as circumstances may require, or to suit the views of different constructers.

In the annexed drawings, Figure 1 is a horizontal axial section of the machine. Fig. 2 is a side elevation thereof. Figs. 3 to 5 are detail views.

The same letters of reference are used in all the figures in the designation of identical parts.

The hollow mandrel A is mounted in suitable bearings B B' rising from the bed-plate C of the machine. The chuck D is firmly secured to the end of the mandrel projecting from the bearing B, it being screwed to the screw-threaded end of said mandrel in this instance. The chuck is tubular or hollow, and is provided with three rotary disks, E, each of which is journaled in the fork of a hanger or bearing, F, fitted in a radial hole in the peripheral wall of the chuck. The bearings F are arranged at equal distances around the chuck, and they are to be so adjusted in their holes or seats that the axes of the rotary disks will be equidistant from the axis of the chuck.

The bearings F have the form of cylindrical plugs, and are snugly fitted in corresponding cylindrical holes in the chuck. Hence they may be circularly adjusted in their seats in order to set the rotary disks in planes intersecting at a greater or less angle the plane passing through the axes of the hangers or bearings F at right angles to the axis of the chuck. The bearings may also be adjusted in a radial direction to adapt the machine for cutting files of varying diameters. When properly adjusted the hangers are secured by means of set-screws $f$.

The rotary disks E, made of tempered steel, are ground to a $\wedge$-edge, and they operate more with an indenting than with a cutting action on the file. Whatever chips may be cut from the file by these rotary disks are discharged through a series of holes, $d$, formed in the peripheral wall of the chuck.

The file to be cut is introduced between the rotary disks with its point, while its end projecting forward from the chuck is supported between a pair of rolls, G G', located in close proximity to the front face of the chuck, turning in horizontal planes. The roll G is mounted on the outer end of an arm, H, pivoted on a stud of the bed-plate, and the roll G' is mounted on a similar arm, H', pivoted on a stud on the other side of the bed-plate.

The arrangement is such that the arms stand at an angle to each other when the adjacent surfaces of the rolls are brought together in the vertical plane of the axis of the chuck, so that the draft upon the file by the rotary disks tends to tighten the gripe of the rolls upon the projecting end of the file. Each roll has a shallow groove, $g$, with sharp edges in its peripheral surface. The grooves are in the same plane and coincident with the horizontal plane of the axis of the mandrel. The sharp edges of these grooves of the rolls will take a firm hold upon the file and prevent it from turning upon its axis.

The mandrel A is provided with a suitable pulley, A', located between the bearings B B', for the purpose of driving it by means of a belt. The standard I is erected in front of the rolls G G' and in line with the mandrel. It is provided with an eye, $i$, in exact alignment with the axis of the mandrel. The file to be cut is passed through this eye to the chuck, and the eye acts as a guide to the file, in connection with the rolls. The end of the hollow mandrel in the chuck is closed by a plug, $a$, provided with a central hole, $a'$, of a diameter slightly in excess of the diameter of the file. This perforated plug thus forms another guide for the file.

In practice each machine should be provided with a series of plugs, $a$, with holes of different diameters, which plugs must be interchanged as files of different diameters are subjected to the action of the machine. In like manner a series of interchangeable standards, I, having eyes of different diameters, may be used; or a single standard may answer for different sizes of files by providing it with means for adjusting the size of its eye $i$.

From the foregoing description it will be understood that the file is embraced by the obliquely-arranged rotary disks, which, by being rotated by the chuck around the file, press and cut into the body of the file to the desired depth, so as to raise a spiral tooth or burr upon it, the file being gradually drawn through the chuck by the action of the obliquely-arranged rotary revolving cutters. After one cut has been made upon a file a second cut may be made upon it by changing the angle of obliquity of the rotary disks. Different styles of rotary disks or cutters will have to be employed for cutting fine and coarse files respectively.

Graduation-marks may be scored on the bearings F and on the chuck around the holes in which the bearings are seated, in order to assist in the adjustment of the rotary disks or cutters.

This machine is adapted for cutting straight round files, also for cutting a single continuous file the full length of a coil of wire, which, when completed, can be cut up into suitable lengths for convenient use.

What I claim as my invention, and desire to secure by Letters Patent, is—

1. The combination, substantially as before set forth, of the hollow mandrel, the hollow chuck, the rotary disks or cutters, and the radially and circularly adjustable bearings carrying said rotary disks.

2. The combination, substantially as before set forth, of the hollow mandrel, the hollow chuck, the rotary disks or cutters, and the grooved rollers in front of the chuck.

3. The combination, substantially as before set forth, of the hollow mandrel, the hollow chuck, the rotary disks or cutters, the grooved rollers in front of the chuck, and the pivoted arms on which said rollers are mounted.

4. The combination, substantially as before set forth, of the hollow mandrel, the removable guide-plug thereof, the hollow chuck, the rotary disks or cutters, the grooved rollers in front of the chuck, and the guide in front of the rollers.

In testimony whereof I affix my signature in presence of two witnesses.

TREAT T. PROSSER.

Witnesses:
WM. HANSBROUGH,
A. S. BROADWAY.